(12) United States Patent
De Vries

(10) Patent No.: US 9,695,804 B2
(45) Date of Patent: Jul. 4, 2017

(54) DEVICE FOR REDUCING THE LOAD ON A SUPPORTING STRUCTURE, IN PARTICULAR AN INERTIAL ENERGY ACCUMULATING DEVICE

(71) Applicant: S4 Energy B.V., Rotterdam (NL)

(72) Inventor: Carl Maria De Vries, Nieuwegein (NL)

(73) Assignee: S4 Energy B.V., Rotterdam (NL)

( * ) Notice: Subject to any disclaimer, the term of this patent is extended or adjusted under 35 U.S.C. 154(b) by 0 days.

(21) Appl. No.: 14/653,377

(22) PCT Filed: Dec. 18, 2013

(86) PCT No.: PCT/NL2013/050913
§ 371 (c)(1),
(2) Date: Jun. 18, 2015

(87) PCT Pub. No.: WO2014/098584
PCT Pub. Date: Jun. 26, 2014

(65) Prior Publication Data
US 2015/0308418 A1    Oct. 29, 2015

(30) Foreign Application Priority Data
Dec. 21, 2012   (NL) ...................... 2010039

(51) Int. Cl.
*F03G 3/08*     (2006.01)
*F03G 7/00*     (2006.01)
*F16C 32/06*    (2006.01)

(52) U.S. Cl.
CPC ................ *F03G 3/08* (2013.01); *F03G 7/00* (2013.01); *F16C 32/0614* (2013.01)

(58) Field of Classification Search
CPC .... F16C 32/0614; F16C 29/025; F16C 39/04; F16C 17/045; F16F 15/315; F16F 15/30; F03G 3/08; H02K 7/025
See application file for complete search history.

(56) References Cited

U.S. PATENT DOCUMENTS 3,994,367 A * 11/1976 Christ ................. F16C 32/0666
                                                    184/5
4,113,325 A *  9/1978 Miller ................. F16C 32/0666
                                                    384/12

FOREIGN PATENT DOCUMENTS

CN        102713154 A     10/2012
DE    102010026235 A1 *    1/2012 ............. F16C 39/04
(Continued)

OTHER PUBLICATIONS

International Search Report and Written Opinion of application PCT/NL2013/050913 mailed May 9, 2014, 7 pages.
(Continued)

*Primary Examiner* — Thomas Diaz
(74) *Attorney, Agent, or Firm* — Thomas | Horstemeyer, LLP

(57) ABSTRACT

The invention relates to a device for reducing the load on a supporting structure comprising a housing defining a chamber, at least one object having a first face and a substantially opposite second face mounted in the chamber by means of the supporting structure and is displaceable relative to the housing leaving free a gap provided with a seal separating a first section and a second section of the chamber, an exposing means for exposing at least the first face to a gas pressure, thereby generating an upward differential pressure force at least partially compensating the object weight, wherein the seal is supported by a movable part of the
(Continued)

housing and the device further comprises a means for adjusting the position of at least said movable part.

15 Claims, 3 Drawing Sheets

(56) References Cited

FOREIGN PATENT DOCUMENTS

| FR | 2 939 480 | 6/2010 |
|----|-----------|--------|
| WO | WO 00/67356 | 11/2000 |
| WO | WO 2010/068090 | 6/2010 |
| WO | WO 2011155838 | 12/2011 |

OTHER PUBLICATIONS

NL Search Report and Written Opinion of application NL2010039 dated Sep. 27, 2013, 6 pages.
English translation of the Chinese Office Action in Application No. 201380067161.6 mailed Apr. 27, 2017, 6 pages.

\* cited by examiner

DEVICE FOR REDUCING THE LOAD ON A SUPPORTING STRUCTURE, IN PARTICULAR AN INERTIAL ENERGY ACCUMULATING DEVICE

CROSS-REFERENCE TO RELATED APPLICATION

This application is the National Stage of International Application No. PCT/NL2013/050913, filed 18 Dec. 2013, which claims the benefit of NL 2010039, filed 21 Dec. 2012, the contents of which are incorporated by reference as if fully set forth herein.

FIELD OF THE DISCLOSURE

The present invention relates to a device for reducing the load on a supporting structure such as bearings, in particular the invention relates to an inertial energy accumulating device allowing, for example, absorbing the fluctuations in the production and/or consumption of energy which are associated with a unit for producing energy, such as an electromotor or wind turbine. A device of the latter type may also be used to recuperate and then restore or use in some other way a retarding and/or slowing power. The device according to the invention may also be used to stabilize a rotational speed.

BACKGROUND

Various types of energy storing systems are known. One type is based on flywheels, that is to say on at least one mass set in rotation by input of energy, which will continue to rotate, under inertia, after the energy input has ceased. The rotating mass is connected to a motor which constitutes a means of inputting energy during the energy-storage periods, or a generator during energy-restoring periods. The heavier the flywheel and the more able it is to rotate quickly with the lowest possible friction, the greater the amount of energy that can be stored. Mounting of the flywheel bearings is therefore of key importance.

In some types of flywheel the bearings are partially relieved of the weight of the flywheel by applying an electromagnetic force.

Another type of flywheel is described in PCT application PCT/NL2009/000248. This flywheel based inertial energy accumulation device comprises a frame and at least one flywheel mounted so that it can rotate relative to the frame about an axis of rotation, as well as means for exposing at least one face of the flywheel to a gas pressure which, by comparison with the pressure applied to a substantially opposite face of the flywheel, generates an upward differential pressure force that at least partially compensates for the weight of the flywheel, such as by means of so-called gas flow slowing means (referred to as a seal in the present application) surrounding the face of the flywheel that is exposed to the gas pressure. It is stated that in this device not only the flywheel bearings are relieved at least partially of the weight of the flywheel, thus increasing their life, but the cost per kWh is also greatly reduced. These gas flow slowing means make it possible to create a drop in pressure head in the leakage space. They are typically formed between the flywheel and a surface integral with the frame. In an embodiment these flow slowing means comprise a labyrinth seal. In such a seal, the gas flow path comprises a succession of special features that generate drops in pressure head ("head drops"). For example, the cross section for the passage of the gas is alternately reduced and enlarged.

Now it has appeared that in a pilot scale model of a device according to said PCT application the total energy losses are unexpectedly high and as a result the time period that the flywheel can deliver energy, e.g. for charging one or more other appliances is relatively short. Therefore the device cannot be operated in an economically feasible manner. Furthermore manufacturing such a device has been complicated because inevitable tolerances in the construction are larger than the design characteristics.

In WO 2011/155838 A1 it has been proposed to use a rotor having an inverted frustoconical shape with a matching (semi-) labyrinth seal in the gap between the upstanding walls. Such a design has a self-centring effect. However, stability and safety of this device leave something to be desired. In general, the vulnerability of the seal is high. In case of emergency, for example failure, defect, accident and the like serious damage to the precisely, often tailor made, special features of the seal is most likely to occur because of (friction) contact between the rotor and the seal. The rotor itself may also become damaged. Furthermore, operation is complex, in particular starting up and maintaining the appropriate gap size.

SUMMARY

Generally, the present invention is directed to reducing the load of an object on its supporting structure.

The present invention is also directed to further improvements of a rotor based inertial energy accumulation device, in particular to reducing the load of the rotor on a bearing.

A further object of the present invention is to improve safety of such a device and/or reduce damage to the seal and/or object such as the rotor in case of failure.

Yet another object of the present invention is to allow positioning of the seal in an accurate manner, allowing controlling levitation of the object such as the rotor mainly by the gas flow. According to the invention a device for reducing the load on a supporting structure comprises a housing defining a chamber, at least one object having a first face and a substantially opposite second face, wherein the object is mounted in the chamber by means of said supporting structure, so that it can be displaced relative to the housing leaving free a gap between the outer object perimeter and the inner perimeter of the chamber, wherein a seal is provided in said gap separating a first section of the chamber and a second section of the chamber, an exposing means for exposing at least the first face of the object in the first section to a gas pressure, which, by comparison with the pressure exerted upon the substantially opposite second face in the second section, generates an upward differential pressure force that at least partially compensates for the weight of the object, wherein said seal is supported by a movable part of the housing and the device further comprises an adjusting means for adjusting the position of at least said movable part of the housing with respect to the object.

In the device according to the invention the object is mounted in a chamber that is defined by the housing, by means of a supporting structure, such as one or more bearings like a pivot bearing (thrust bearing). A gap is present between the outer perimeter of the object and the inner perimeter of the housing. A gas permeable (i.e. allowing flow of gas) seal as gas flow restricting means is provided in the gap. In order to reduce the load on the bearing a differential gas pressure is applied over the object, thereby levitating the object. In view of minimizing the flow of gas from the first section to the second section of the chamber the distance between seal and object and thus the levitation height is kept small, usually in the orders of tens of micrometers. Such a small height determined by the gas flow however is insufficient to reduce the load on a bearing essentially, where the play is usually in the order of several tenths of millimeters. In the device according to the invention upon levitation the position of the seal that is supported by the adjusting means, with respect to the supporting structure is adjusted using the adjusting means such that the distance of the object from its supporting structure is increased until the load on the supporting structure is essentially relieved, while the distance from the seal to the levitated object does not change essentially. In a preferred embodiment the at least one object can rotate relative to the housing about an axis of rotation leaving free a gap between the outer object perimeter and the inner perimeter of the chamber, e.g. a rotor, flywheel, centrifuge, lathe and the like. In this embodiment the object can have a horizontal axis of rotation, where levitation reducing the load on bearings is a vertical displacement. In a most preferred embodiment the rotatable object has a vertical axis of rotation, while again levitation is in the vertical direction.

In a further preferred embodiment thereof, in particular for accumulating inertial energy, the device according to the invention comprises a housing defining a rotor chamber, the at least one object being at least one rotor having a bottom end face as first face and a substantially opposite top end face as second face, the rotor being mounted in the rotor chamber, so that it can be displaced vertically relative to the housing and so that it can rotate relative to the housing about a vertical axis of rotation leaving free the gap between the outer rotor perimeter and the inner perimeter of the rotor chamber, wherein the seal is provided in said gap separating a first section of the rotor chamber and a second section of the rotor chamber, and wherein the exposing means are means for exposing at least the bottom end face of the rotor in the first section to a gas pressure, which, by comparison with the pressure exerted upon the substantially opposite top end face in the second section, generates an upward differential pressure force that at least partially compensates for the weight of the rotor.

The inertial energy accumulation device according to the invention comprises a housing having walls, such as a bottom wall, a (cylindrical) upstanding wall and a top wall, which housing is generally airtight sealed to the environment. The interior of the housing defines a rotor chamber, in which—spaced apart from the walls of the housing by a gap during operation—a rotor such as a flywheel is mounted. The rotor is capable of rotation about a vertical axis. Usually a rotation shaft extends from both end faces of the rotor into suitable bearings that are provided in the top and bottom of the housing. In an advantageous embodiment the rotation shaft only extends from the bottom end face of the rotor into a suitable (pivot) bearing in the bottom of the housing. The rotor can be coupled to a means for inputting energy such as an electromotor or wind turbine during storing times and to a generator during discharge periods for delivering energy to one or more appliances. The rotor having a relatively high weight has an outer perimeter, defined by the bottom end face, the opposite upper end face and e.g. upstanding wall(s) that connect the two end faces. A gas permeable (i.e. allowing flow of gas) seal as gas flow restricting means is provided in the gap. This seal divides the rotor chamber into a first (lower) section of the rotor chamber and a second (upper) section of the rotor chamber. The top face of the rotor is contained in the upper section, while the bottom face is contained in the lower section at least partly. The device also comprises a means for exposing at least the bottom end face of the rotor in the first section to a gas pressure which, by comparison with the pressure exerted on the substantially opposite top end face in the upper section generates an upward differential pressure force that at least partially compensates for the weight of the rotor. This pressure difference is mainly generated by the seal. Generally gas will be blown—or sucked away in sub atmospheric operation—almost from one or more positions in the bottom of the housing centred around the vertical rotation axis, while a concentric seal is positioned concentrically with the vertical axis of rotation. During operation the rotor rotates freely above the bottom of the housing. As explained above, adjustment of the position of the seal contributes to reducing the load on the supporting bearing. In case of an emergency there is also a risk that the rotor will lower and contact the seal irrespective its position. In order to protect the seal against damage in such a situation, the adjusting means can be operated to retract the seal supported by the movable part into the respective section of the housing adjacent to the movable part, thereby preventing contact and thus damage to the vulnerable and expensive seal. Thus this design of the device according to the invention allows for an easy and safe operation.

The applicant has also discovered that preferably the gap width should be very small for economical operation, in the order of tens of micrometers to hundreds of micrometers. However, tolerances in the construction easily exceed such small dimensions, if the seal would be a stationary part of the device. A movable part carrying the seal enables to set such a small gap. Then the adjusting means allow for an accurate positioning of the movable part and thus the seal at the level of micrometers. In view of energy efficiency considerations the flow of gas into the gap is preferably small, but sufficient for levitation of the object. This requires a sufficient pressure drop over the seal between the first and second section. A very small gap width in the seal, e.g. less than 100 micrometer, such as 50 micrometer, has proven to be successful.

Actual levitation of the object during operation is controlled primarily by adjusting the gas flow upon flow fluctuations. Further adjustment of the movable part by means of the adjusting means may contribute in stabilizing the position of the object with respect to the housing. The latter is a slow adaptation compared to flow control.

The seal in the gap between the inner walls of the housing and surfaces of the object allows a restricted flow of gas from the bottom section of the chamber to the upper section thereof. Advantageously the seal supported by the movable part is a labyrinth seal, comprising—as seen in the direction of flow of the gas supplied or sucked away—a series of projections and/or grooves that create drops in pressure head, in the face of the seal opposite the rotor. Typically, the cross-section for the passage of gas in the gap is reduced and enlarged in an alternating manner. Typically the co-operating face of the object is substantially flat.

In a further preferred embodiment the movable part comprises a body concentrically with the (vertical) axis of the object. Advantageously the seal is also concentric with this axis. The movable part is preferably exchangeable.

The seal may be positioned in the upstanding wall of the housing, e.g. as taught in WO 2011/155838 A1. In such an embodiment the seal, as well as its movable support advantageously comprises at least two parts that can be dissociated, otherwise an annular seal of which the diameter has to be increased, could not be retracted into the face of the housing.

Therefore in a preferred embodiment the movable part that supports the seal is a vertically movable part of the bottom of the housing. Advantageously in this preferred embodiment the movable part is arranged at a radial distance of 30-70% of the radius of a cylindrical chamber predominantly determined by a balance between the area available for levitation and the volume of the chamber, e.g. a rotor chamber wherein a rotor can rotate almost without any friction.

Then preferred adjusting means are means for adjusting the height position of the vertically movable part of the bottom of the housing with respect to the height position of the supporting structure.

Advantageously the seal comprises at least one annular protrusion and/or annular recess in its face opposite the object, such as a rotor having a vertical axis of rotation. This recess is advantageously connected to a means for discharging gas, such as a suction pump, via respective conduits, thereby causing a sufficient pressure drop over the seal. Preferably the movable part comprises a body provided with a gas flow channel having a first end in fluid communication with said recess and having a second end in fluid communication with a means for sucking gas from the recess.

In a further preferred embodiment thereof the seal comprises multiple annular recesses, preferably concentrically arranged around the vertical axis of the object, wherein at least two recesses each are connected to suction means for sucking gas from the respective recesses. Thus the suction at these recesses can be controlled individually, thereby allowing stepwise reduction of the gas pressure from the first section to the second section over the seal. E.g. the seal may comprise three recesses, each having its own suction points and each connected to its own pump or the like. The first one reduces the gas pressure from about 500-100 mbar to 200-50 mbar, the second further down to 100-10 mbar and the third to 1-0.005 mbar. Stepwise reduction of the gas pressure over the seal is preferred in view of energy losses by friction and energy consumption by the pumps. Thus preferably the seal comprises multiple annular recesses, of which at least two recesses each are in fluid communication with first ends of associated gas flow channels in the body of the movable part supporting the seal, and wherein second ends thereof are in fluid communication with suction means for sucking gas from these recesses. The suction means are preferably designed such that the pressure over the seal is outwardly radially reduced stepwise.

The or each suction means can comprise at least one pump, of which the suction side is connected to a recess and the discharge side is connected to the exposing means. In this way a substantially closed loop for circulation of gas is established.

In an advantageous embodiment of a rotatable object, in particular an energy accumulating device comprising a rotor having a vertical axis of rotation, the exposing means are designed in such a way that the absolute gas pressure in the first section exerted on the bottom end face of the object (rotor) is less than atmospheric pressure, e.g. in the range of 100-500 mbar. Preferably the second or upper section is maintained at a pressure of less than 10 mbar, more preferably less than 5 mbar and most preferably less than 2 mbar, such as 1 mbar. Then friction of the rotating object in an almost vacuum upper section is small.

Optionally, the device according to the invention also comprises an auxiliary means for reducing the pressure in the second upper section in addition to the other means discussed above. This means such as a pump is actuated during start up and creates a vacuum in the second section and effectively "pulls" the rotor to a higher level. Once the object is in operation position such as a rotational motion in case of a rotor, the action of this auxiliary means can be stopped.

Preferred adjusting means are selected from the group comprising piston-cylinder assemblies, motors, spindles, linear actuators, electromagnets. Pneumatic piston-cylinder assemblies are most preferred.

Advantageously the gap width, in particular at the seal, is monitored on a continuous basis. As said, control of the gap width during operation is predominantly carried out by adjusting the gas flow for levitation. In case of an emergency, e.g. indicated by a change of the gap width beyond a predetermined level or range, the monitoring means are designed to activate the adjusting means for retracting the seal into the respective housing section.

Monitoring of the gap width is preferably carried out using distance measurement means, such as laser means, for determining the distance between a part of the housing, e.g. the seal, and at least an opposite part of the object, and using control means for actuating the adjusting means based on signals representing the distance determined by the distance measurement means, if required, e.g. if a deviation of the measured distance from a set distance exceeds a threshold value.

In a further preferred embodiment the device according to the invention also comprises means for determining displacement of the object with respect to the supporting structure, more preferably means for determining vertical displacement of a rotor having a vertical axis of rotation with respect to a supporting (pivot) bearing.

In a further advantageous embodiment the height adjusting means are typically arranged below the vertically movable part in a recess in the bottom of the device. In order to prevent leakage from the first section to the second section bypassing the seal, a flexible gas impermeable membrane, such as an annular disc shaped metal foil, is mounted between the movable part and a stationary part of the housing, such as the bottom part, preferably at the upstream side of the movable part as seen in the flow direction of gas. The flexibility of the membrane enables the edge thereof, preferably the outer edge, mounted to the movable part to follow any movement, while the opposite (preferably inner) edge maintains mounting of the membrane to a stationary part.

The device may comprise a heat exchanger between the gas suction side and the gas delivery side for cooling the gas. During use the gas heats up due to compression and/or friction between the gas and the rotor. In order to prevent thermal damage to the device the heat exchanger cools the gas when not in contact with the rotor.

The gas sucked in and/or delivered is preferably predominantly made up of air, hydrogen or helium, because of their low coefficients of friction and low viscosities. Generally helium is preferred on account of its stability and its low coefficient of friction.

The object may be a hollow cone rotor, wherein the mass is concentrated in the outer walls and faces. This is in particular applicable to industrial applications. In a preferred embodiment, e.g. for relatively small domestic applications, the object is solid, e.g. made from reinforced concrete or metal. If necessary, the object may be reinforced by reinforcing elements like crossed spokes.

A particular use of an inertial energy accumulating device according to the invention is directed to absorbing fluctuations in the production and/or consumption of energy which are associated with a unit for producing energy, particularly electrical energy, particularly using a wind turbine.

Typically such an inertial energy accumulating device according to the invention is connected to a motive source, such as a wind turbine, a motor powered by solar energy, or electromotor in order to charge the rotor. Discharging typically occurs through a generator in order to convert the rotational speed of the rotor into electricity.

BRIEF DESCRIPTION OF THE DRAWINGS

The several aspects of the invention are further illustrated by the attached drawing, wherein.

DETAILED DESCRIPTION

Figure 1:
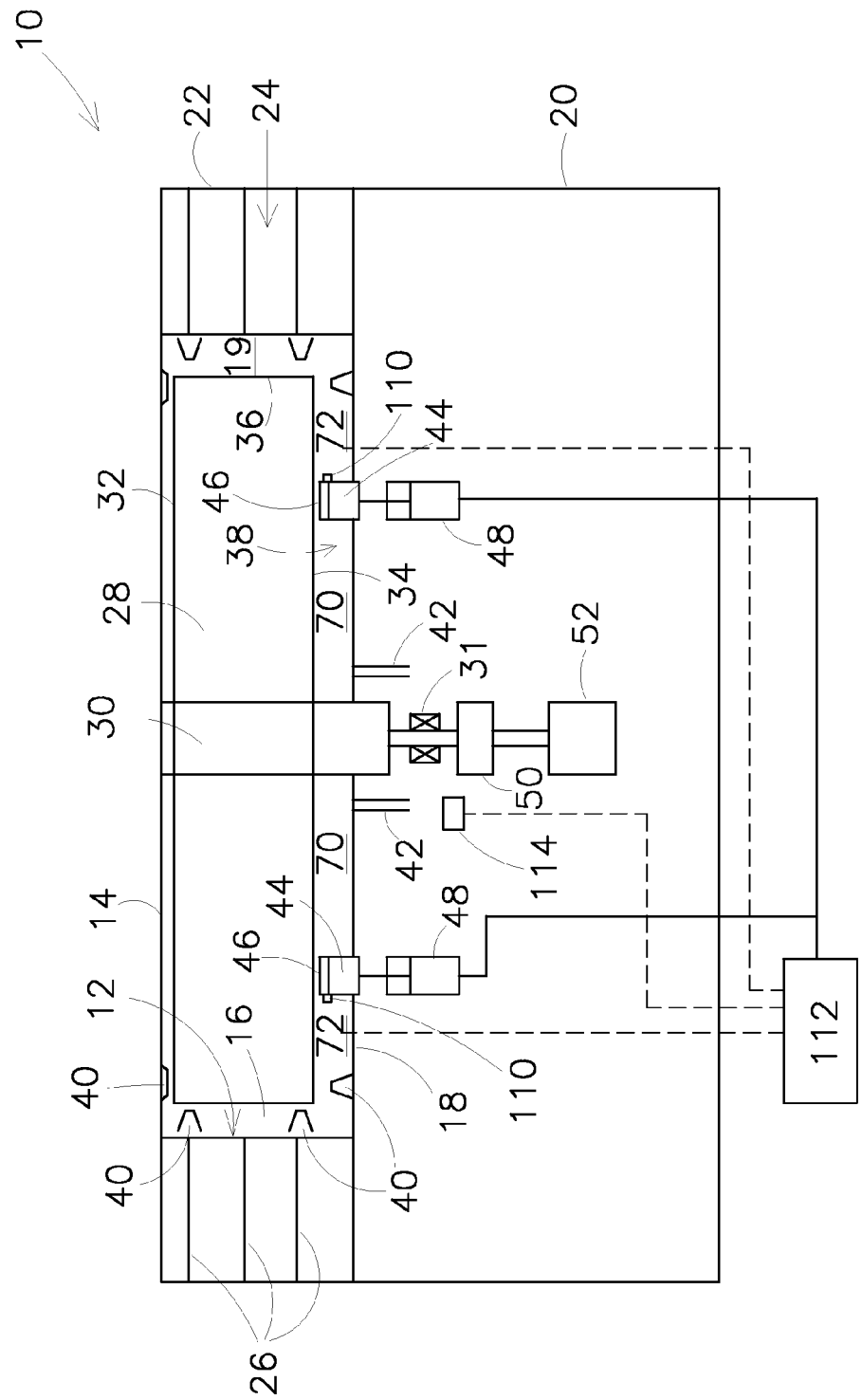
FIG. 1 is a schematic overall presentation of an embodiment of the device according to the invention.

In the following detailed discussion of the various embodiments shown in the FIGS. 1-3 similar parts are indicated by the same reference numerals.

An inertial energy accumulating device 10 according to the invention comprises a generally cylindrical housing 12 having top wall 14, e.g. a detachable circular cover plate, a cylindrical upstanding wall 16 and a bottom 18. The interior of the housing 12 defines a rotor chamber 19. The housing 12 may be contained in a tray type tank 20. The top wall 14 extends till the upstanding wall 22 of the tank 20. Between the upstanding wall 14 and 22 respectively a crumple zone 24—diagrammatically shown by 3 annular plates 26—is present in this embodiment for limiting damage in case of failure. A disc shaped rotor 28 having a relatively large diameter compared to its thickness is mounted in the rotor chamber 19, such that the rotor is able to rotate about its vertical axis of rotation 30. The shaft 30 is held in a supporting structure, here suitable pivot bearings 31 in the bottom, and optionally in the top wall. The rotor 28 has a top end face 32, a bottom end face 34 and a cylindrical upstanding wall 36 between the end faces 32 and 34. The rotor may be massive. In case of a non-massive rotor preferably the weight will be present at the outer periphery of the rotor. Between the housing 12 and rotor 28 a small gap 38 (for sake of clarity the figure is not drawn to scale) is present, except at the position of vertical shaft 30. Bumper blocks 40 are provided on the cylindrical wall 16 of housing 12 opposite to cylindrical wall 36 of the rotor 28, as well as near the periphery of the rotor on the top wall 14 and bottom 18 respectively. In case of unbalanced rotation, the rotor 28 collide with these blocks 40 thereby braking the rotor rotation and limiting damage. Reference numeral 42 indicates gas inlets, through which by means of a pump (not shown in FIG. 1) gas is blown against or sucked away from the lower end face 34 thereby providing an upward force. In this embodiment the bottom 18 comprises an annular ring shaped part 44, which is able to move in vertical direction. The upper face of part 44 is provided with a seal 46, as shown in more detail in FIGS. 2 and 3. Pneumatic piston cylinders 48 are provided as means for displacing the bottom part 44 vertically. An (electromagnetic) coupling 50 connects the shaft 30 to a device 52 for inputting energy in case of storage of energy or a generator in case of discharge.

Figure 2:
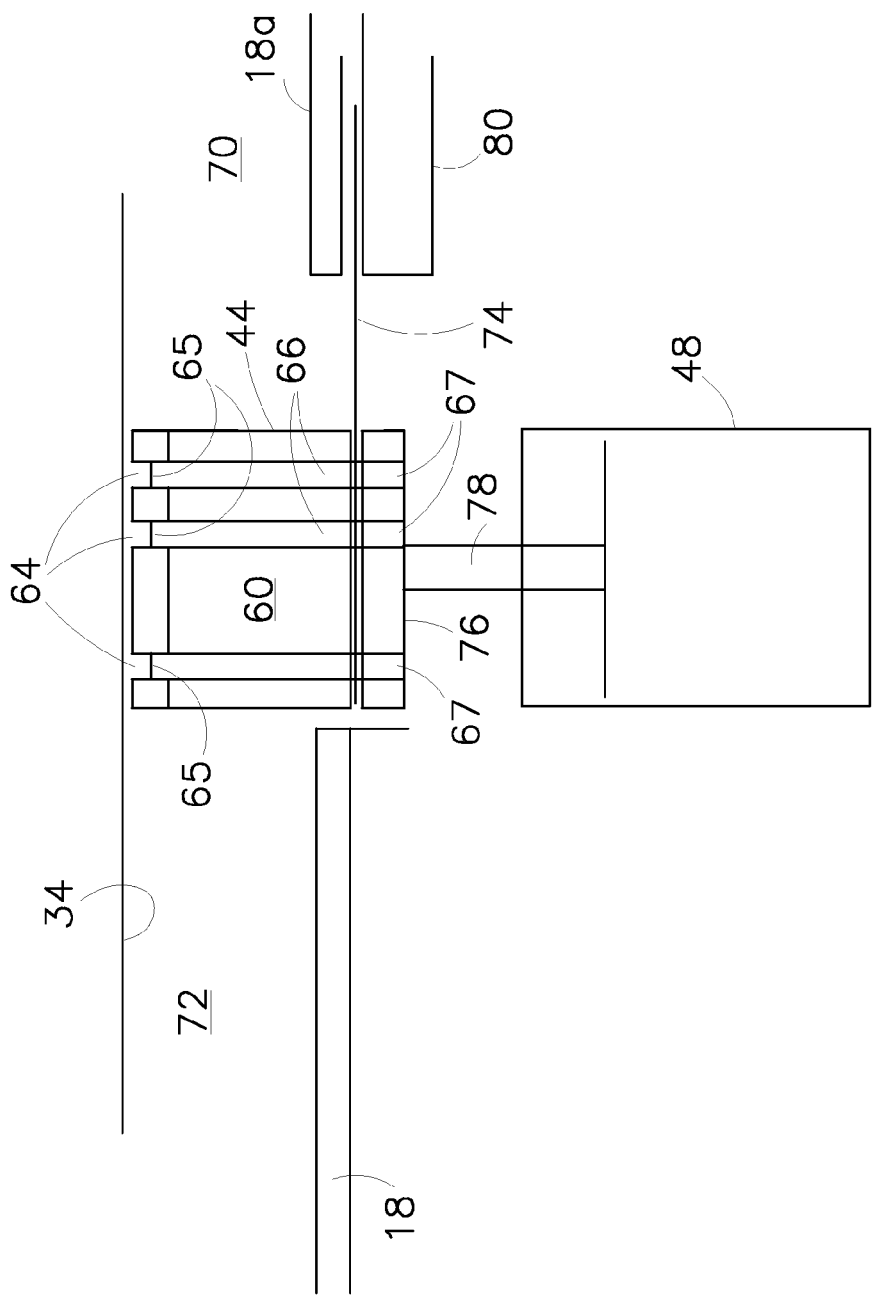
FIG. 2 is a schematic presentation of an embodiment of a moveable bottom part of a device according to the invention.

FIG. 2 is a detail of an embodiment of a device according to the invention, showing in cross section the moveable bottom part 44 in relation to the substantially flat bottom end face 34 of the rotor 28 and bottom 18 of the housing 12. The movable bottom part 44 comprises an annular body 60, of which the top face is provided with a labyrinth seal 46 comprising a number of concentric recesses or grooves 64. At the bottom these recesses 64 have outlets 65, preferably slit shaped outlets continuing into bell shaped canals 66 in the body 60, which at the other ends 67 are connected to pumps 68 (see FIG. 3). In order to prevent leakage of gas from the first section 70 of the rotor chamber having a pressure of about 300 mbar to the second section 72, wherein the pressure is very low, a flexible gas impermeable seal 74 is provided between bottom part 18a and part 44. In the embodiment shown the seal 74, e.g. an annular thin sheet, e.g. made from plastic or metal foil is clamped between the body 60 and a support 76 on piston rod 78 of piston cylinder assembly 48 at the outer circumference and similarly between bottom part 18a and a lower clamping ring 80, e.g. using bolts (not shown). Thus gas introduced for lifting the rotor 28 flows from the first section 70 via seal 46 in the direction of the second section 72 having a pressure of e.g. 1 mbar, while gas is sucked from the recesses 64. In this way pressure is reduced in a stepwise manner, which is favourable in view of economics and safety.

Figure 3:
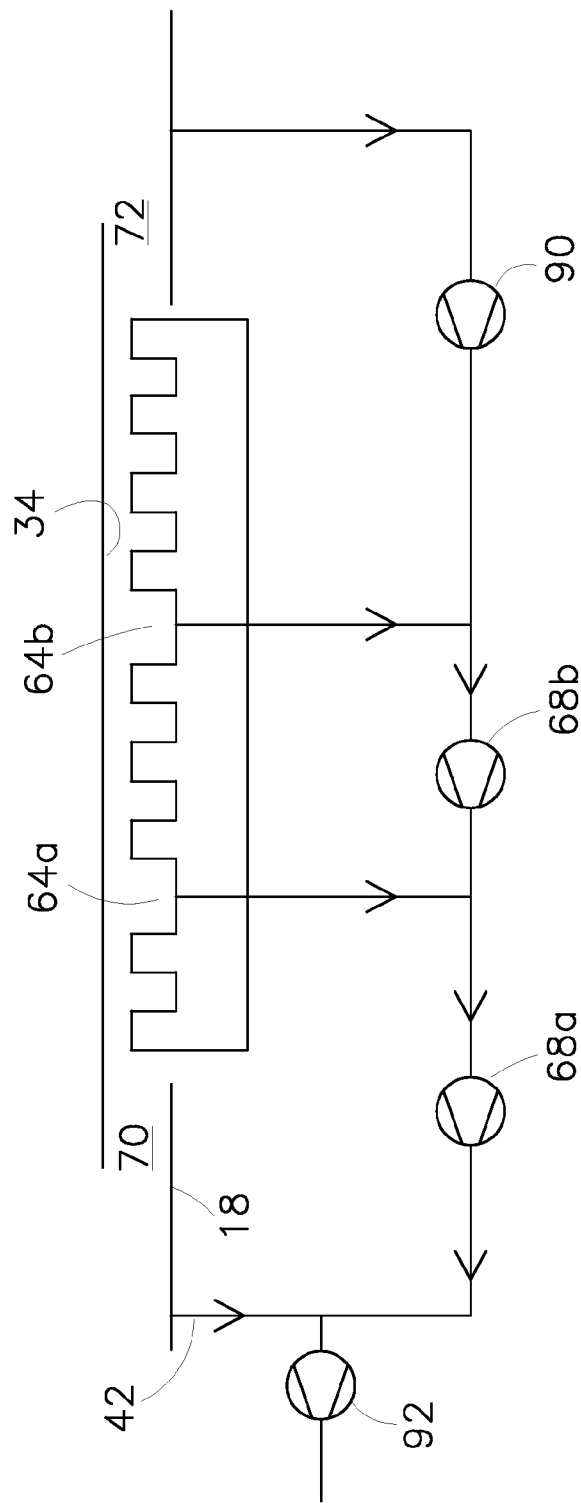
FIG. 3 is a schematic presentation of an embodiment of the pressure reduction in a seal of a device according to the invention.

FIG. 3 shows a typical example. During operation whether during charge or discharge of the device, when the upper section 72 is evacuated from gas by means of suction pump 90, a suitable pressure difference is maintained through pump 92 via inlets 42 forcing the rotating rotor 28 upward, until the lifting force and rotor weight are balanced. In the embodiment of FIG. 3 the pressure is reduced from the first section 70 to a pressure of e.g. 110 mbar by means of pump 68a in the first recess 64a, by means of pumps 68a and 68b to 30 mbar in recess 64b and further down to a pressure of 1 mbar in second section 72 using pumps 68a, 68b and 90. Typically the flow rate of the gas is low at recess 64b and high at 64a.

Returning to FIG. 1, the distance of the rotor from the seal 46 is determined at one or more distance measurement devices 110, the output of which is processed in controller 112, which regulates the piston cylinder assemblies 48 in order to set the gap between seal 46 and rotor bottom 34 at the start of operation. Main control of the gap width during operation is carried out by regulating the gas flow. If data from the distance measurement device(s) 110 as examples of monitoring means as processed by the control means 112 indicate an unacceptable deviation from predetermined values, then the control means 112 activate the adjusting means 48 in order to retract the movable seal supporting part 44 and/or the exposing means 42. Also in case of leakage or gas flow variations the system of the invention contributes to maintaining a steady and safe performance.

Reference numeral 114 indicates means for determining vertical displacement of the shaft 30. Operation of the device is as follows. In its rest position the height adjusting means 48 supporting the bottom part 44 and seal 46 are retracted and the rotor 28 is carried by its supporting structure 31 and/or the bumper blocks 40. Then the height adjusting means 48 are actuated and the seal 46 abuts the bottom end face 34 of rotor 28. Next the various pumps 90, 92 for levitating the rotor 28 by creating a upwardly directed differential pressure force are operated. The rotor 28 is then carried by a gas cushion. Then the height position of the seal 46 is further increased at constant gas flow, thereby further raising the rotor 28 until the axis 30 thereof no longer bears on the supporting structure 31, e.g. monitored using means 114, and thus the load on bearing 31 is relieved.

The invention claimed is:

1. A device for reducing the load on a supporting structure comprising a housing defining a chamber, at least one object having a first face and a substantially opposite second face, the object being mounted in the chamber by means of said supporting structure, so that it can be displaced relative to the housing leaving free a gap between the outer object perimeter and the inner perimeter of the chamber, wherein a seal is provided in said gap separating a first section of the chamber and a second section of the chamber, an exposing means for exposing at least the first face of the object in the first section to a gas pressure, which, by comparison with the pressure exerted upon the substantially opposite second face in the second section, generates an upward differential pressure force that at least partially compensates for the weight of the object, the exposing means comprising one or more gas inlets connected to at least one pump, wherein said seal is supported by a movable part of the housing and the device further comprises an adjusting means for adjusting the position of at least said movable part of the housing with respect to the object.

2. The device according to claim 1, wherein the at least one object can rotate relative to the housing about an axis of rotation leaving free a gap between the outer object perimeter and the inner perimeter of the chamber.

3. The device according to claim 2, wherein the housing defines a rotor chamber and the at least one object being at least one rotor having a bottom end face as the first face and a substantially opposite top end face as the second face, the rotor being mounted in the rotor chamber, so that it can be displaced vertically relative to the housing and so that it can rotate relative to the housing about a vertical axis of rotation leaving free the gap between the outer rotor perimeter and the inner perimeter of the rotor chamber, wherein the seal is provided in said gap separating the first section of the rotor chamber and the second section of the rotor chamber, and wherein the exposing means are means for exposing at least the bottom end face of the rotor in the first section to a gas pressure, which, by comparison with the pressure exerted upon the substantially opposite top end face in the second section, generates an upward differential pressure force that at least partially compensates for the weight of the rotor.

4. The device according to claim 1, wherein the movable part is a vertically movable part of the bottom of the housing.

5. The device according to claim 4, wherein the adjusting means are means for adjusting the height position of the vertically movable part of the bottom of the housing with respect to the height position of the supporting structure.

6. The device according to claim 1, wherein the seal comprises at least one annular protrusion and/or annular recess at its face opposite the at least one object.

7. The device according to claim 6, wherein the movable part comprises a body provided with a channel having a first end in fluid communication with said recess and having a second end in fluid communication with a means for sucking gas from the recess.

8. The device according to claim 6, wherein the seal comprises multiple recesses, wherein at least two recesses each are in fluid communication with first ends of associated flow channels in the body of the movable part, the second ends thereof being in fluid communication with means for sucking gas from these recesses.

9. The device according to claim 8, wherein the suction means are designed such that the pressure over the seal is outwardly radially reduced stepwise.

10. The device according to claim 8, wherein the suction means comprise a pump, of which the suction side is connected to the respective recess, and the discharge side is connected to the one or more gas inlets.

11. The device according to claim 1, wherein said adjusting means are selected from the group consisting of piston-cylinder assemblies, motors, spindles, linear actuators, electromagnets.

12. The device according to claim 11, wherein the adjusting means are pneumatic piston-cylinder assemblies.

13. The device according to claim 1, further comprising monitoring means for monitoring the position of the rotor with respect to the seal, and control means for actuating the adjusting means based on signals of the monitoring means.

14. The device according to claim 13, wherein the monitoring means comprise distance measurement means for determining the distance between the seal and the rotor.

15. The device according to claim 14, wherein the monitoring means comprise distance measurement means for determining the distance between the top face of the seal and the bottom end face of the rotor.

* * * * *